United States Patent [19]
Wiedeman et al.

[11] Patent Number: 5,812,932
[45] Date of Patent: Sep. 22, 1998

[54] MOBILE SATELLITE USER INFORMATION REQUEST SYSTEM AND METHODS

[75] Inventors: Robert A. Wiedeman, Los Altos; Paul A. Monte, San Jose; Kent A. Penwarden, Los Altos, all of Calif.

[73] Assignee: Globalstar L.P., San Jose, Calif.

[21] Appl. No.: 559,081

[22] Filed: Nov. 17, 1995

[51] Int. Cl.$^6$ .................................................. H04B 7/185
[52] U.S. Cl. .................. 455/13.1; 455/12.1; 455/427; 455/430; 455/457; 342/357; 342/352; 342/457; 370/316
[58] Field of Search .................. 455/13.1, 12.1, 455/11.1, 33.1, 54.1, 54.2, 25, 89, 56.1, 53.1, 422, 427, 430, 435, 436, 437, 507, 514, 517, 524, 550, 575; 370/316, 310, 320; 342/357, 352, 353, 457

[56] References Cited

U.S. PATENT DOCUMENTS

| | | |
|---|---|---|
| Re. 32,905 | 4/1989 | Baran . |
| 4,901,307 | 2/1990 | Gilhousen et al. . |
| 5,010,317 | 4/1991 | Schwendeman et al. ........... 340/311.1 |
| 5,073,900 | 12/1991 | Mallinckrodt . |
| 5,081,703 | 1/1992 | Lee . |
| 5,109,390 | 4/1992 | Gilhousen et al. . |
| 5,119,225 | 6/1992 | Grant et al. . |
| 5,187,805 | 2/1993 | Bertiger et al. ........................ 455/12.1 |
| 5,216,427 | 6/1993 | Yan et al. ................................ 342/352 |
| 5,233,626 | 8/1993 | Ames . |
| 5,235,633 | 8/1993 | Dennison et al. . |
| 5,239,671 | 8/1993 | Linquist et al. ........................ 455/13.1 |
| 5,303,286 | 4/1994 | Wiedeman . |
| 5,313,215 | 5/1994 | Walker et al. ........................... 342/352 |
| 5,323,164 | 6/1994 | Endo ....................................... 342/357 |
| 5,339,330 | 8/1994 | Mallinckrodt . |
| 5,410,728 | 4/1995 | Bertiger et al. ........................ 455/13.1 |
| 5,415,368 | 5/1995 | Horstein et al. . |
| 5,422,647 | 6/1995 | Hirshfield et al. ..................... 342/354 |
| 5,433,726 | 7/1995 | Horstein et al. . |
| 5,439,190 | 8/1995 | Horstein et al. . |
| 5,444,450 | 8/1995 | Olds et al. .............................. 342/357 |
| 5,446,756 | 8/1995 | Mallinckrodt ........................... 375/200 |
| 5,448,623 | 9/1995 | Wiedeman et al. . |
| 5,583,514 | 12/1996 | Fulop ...................................... 342/359 |

FOREIGN PATENT DOCUMENTS

| | | |
|---|---|---|
| 0 421 698 AZ | 10/1991 | European Pat. Off. . |
| WO 90/13186 | 11/1990 | WIPO . |
| WO 91/09473 | 6/1991 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

(List continued on next page.)

*Primary Examiner*—Reinhard J. Eisenzopf
*Assistant Examiner*—Doris To
*Attorney, Agent, or Firm*—Perman & Green, LLP

[57] ABSTRACT

Disclosed are methods and apparatus for use in a satellite communications system (10) that enable a user to gain knowledge of a direction to one or more "best" satellites available to the user. This information enables the user to alter his or her position to take advantage of the one or more "best" satellites at any particular time in order to facilitate the ability to log-on, initiate and receive calls, and complete calls. The information can be supplied by the user terminal (13) itself, or by a gateway (14). The information can be employed by the user to select for a period of time, by example, a position on an east side of a building, to move to a south-east facing window, or to take some other action that enhances the user's connectivity to one or more of the satellites.

40 Claims, 6 Drawing Sheets

OTHER PUBLICATIONS

Application of TRW Inc. for Authority to Construct a New Communications Satellite System Odyssey$^{sm}$ before the FCC, Washington, D.C. 20554, May 31, 1991, pp. 33–51.

Application of Ellipsat Corporation ELLIPSAT for the Authority to Construct ELLIPSO$^R$I An Elliptical Orbit Satellite System, before the FCC, Washington, D.C. 20554, Nov. 2, 1990, pp. 5–34.

Application of Loral Cellular System, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication System", S. Kato et al., IEICE Transactions, vol. F 74 No. 8 Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS$^R$ Mobile Satellite Communications and Positioning System", E. Liedemann, Jr. et al., Vehicle Electronics in the 90's: Proceedings of the In'l. Congress on Transportation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–38.

TRACK OF SATELLITE
"B" FOR TIME (T TO T + DELTA T)

TRACK OF SATELLITE
"B" FOR TIME (AT TIME = T)

MOBILE SATELLITE USER INFORMATION REQUEST SYSTEM AND METHODS

FIELD OF THE INVENTION

This invention relates generally to communications systems having mobile users and, in particular, to satellite-based communications systems wherein mobile user terminals are connected via at least one satellite to a terrestrial communications system.

BACKGROUND OF THE INVENTION

Mobile communications systems, and in particular Global Mobile Communications Systems employing a constellation of earth orbiting satellites, can exhibit blocking and shadowing of users which are attempting to connect or remain connected to one or more of the satellites. The satellites relay duplex user RF signals to terrestrial-based gateways for further connection to, by example, the Public Switched Telephone Network (PSTN). However, if the access of a given user is blocked to one or more satellites, the user may experience an inability to log onto the system, to initiate or receive calls, or to continue a call that is in progress. This problem is especially apparent when the user is a mobile user, and is in motion with respect to possible RF obstructions, such as foliage and buildings.

With known types of mobile user satellite systems, particularly geosynchronous satellite systems, generally only one satellite is in view of the user. Furthermore, the location of the satellite, on or about the equator, specifies the direction from the user to the satellite. In the northern hemisphere this direction is generally south.

However, recent advances in the communication, computer, and small satellite technology has enabled the concept of providing a constellation of satellites, wherein over large portions of the Earth's surface at least two satellites can be in view of any location. Furthermore, the development of hand-held user terminals using Code Division Multiple Access (CDMA) has made possible multiple satellite coverage employing diversity techniques as a means of mitigating shadowing and blocking of users. By example, a user terminal is enabled to maintain a connection simultaneously through two or more satellites of a constellation of LEO satellites that are simultaneously in view.

One problem that is presented when deploying a constellation of, by example, Low Earth Orbit (LEO) satellites is that the user generally cannot directly perceive the best direction to either face or move to in order to maximize his or her ability to establish or maintain communications through one or more of the satellites. This is because the satellites are in motion with respect to the user, and furthermore the satellites may not be, at any given time, located in some predetermined and essentially constant direction with respect to the user (i.e., south as in the geosynchronous satellite case).

For a constellation of earth orbit satellites (in non-polar orbits) it can be shown that the portion of the sky wherein a user will "see" the satellites is a function of latitude. At the equator (0° latitude) the sky is uniformly covered by satellite tracks, whereas at approximately 70° north latitude in only a relatively small portion of the southern sky will a user see a satellite. For intermediate latitudes the size of the region wherein no satellites are found, referred to herein as "obscura", grows progressively small as the equator is approached. The southern latitude case is the mirror image of the northern latitude case for circular orbits.

Furthermore, in a typical case a variety of signal blocking obstructions are found, such as buildings, utility poles, trees, etc., in addition to the region wherein no satellites pass (obscura). It should be apparent that at any given time only a portion of the sky may be optimum for carrying a communication between a terrestrial user terminal and one or more of the satellites.

This problem is compounded if the user is located within a building, as the relatively high frequencies (e.g., S-band) that may be used on the forward link between the satellite and the user terminal will not normally penetrate to any great distance within the building. As a result, the user will typically experience better link quality if the user is located near to a window through which the satellite(s) can be "seen".

It might be thought that if a user would always go to a south-facing window (in the northern hemisphere) that the best link quality will always be experienced. However this may not be the case. By example, assume that the user is being provided with two satellite diversity (i.e., a communication is being simultaneously conveyed through two satellites) and that three satellites are in view. Depending on which two satellites are being used, in one case a south-west facing window may be optimum, while for the second case a south-east facing window may be optimum. In either case a north-facing window would most likely provide for the poorest link quality (absent some fortuitous placement of signal reflecting surfaces).

It is thus an object of this invention to provide methods and apparatus to assist a user of a mobile communication satellite system to log on to, initiate and receive calls, and maintain calls.

SUMMARY OF THE INVENTION

The foregoing and other problems are overcome and the object of the invention is realized by methods and apparatus that enable a user to gain knowledge of a direction to one or more "best" satellites available to the user. This information enables the user to alter his or her position to take advantage of the one or more "best" satellites at any particular time in order to facilitate the ability to log-on, initiate and receive calls, and complete calls. The information can be supplied by the serving system, and can be employed by the user to select for a period of time, by example, a position on an east side of a building, to move to a south-east facing window, or to take some other action that enhances the user's connectivity potential to the satellite communications system.

This teaching of this invention exploits the fact that a gateway within whose service area a user terminal is located is aware of the location (latitude and longitude) of the user terminal, and can compute from satellite ephemeris data the locations and elevation angles of all satellites in view of the user terminal. Alternatively, the gateway can send satellite ephemeris data to the user terminal, which can then compute the locations and elevation angles of the satellite(s) in view. The gateway can also be aware of the terrain associated with the user terminal's location, based on stored terrain maps. In this case the gateway can send a message to the user terminal over the forward link informing the user terminal as to some action to take to improve or optimize the link quality, based on the current and/or expected location(s) of the satellite(s). This message is received by the user terminal controller, is decoded, and can be displayed or otherwise made known to user.

This information to the user can be automatically generated and sent by the gateway, or may be generated and sent by the gateway only in response to a request from the user. By example, if the user keys in a predetermined code into the keypad, the code is sent on the return link, via one or more satellites, to the gateway.

It is also within the scope of this invention to have the user terminal identify its immediate environment through the use of a transmitted code, and to have the gateway thereby tailor or refine the instruction to user. By example, the user may key in one code to indicate that the user is located within a building, another code to indicate that the user is within a heavily wooded area, and another code to indicate that the user is within an urban area and is surrounded by tall buildings.

The user can be routinely prompted for an indication of his immediate environment, or only on the occasion when the gateway determines from user terminal power control information that the user is located in a region of strong shadowing or signal blockage. If the user can be then guided to a better location for placing or continuing the call the call availability is increased, less system power is required, and an increase in total system capacity can be realized.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
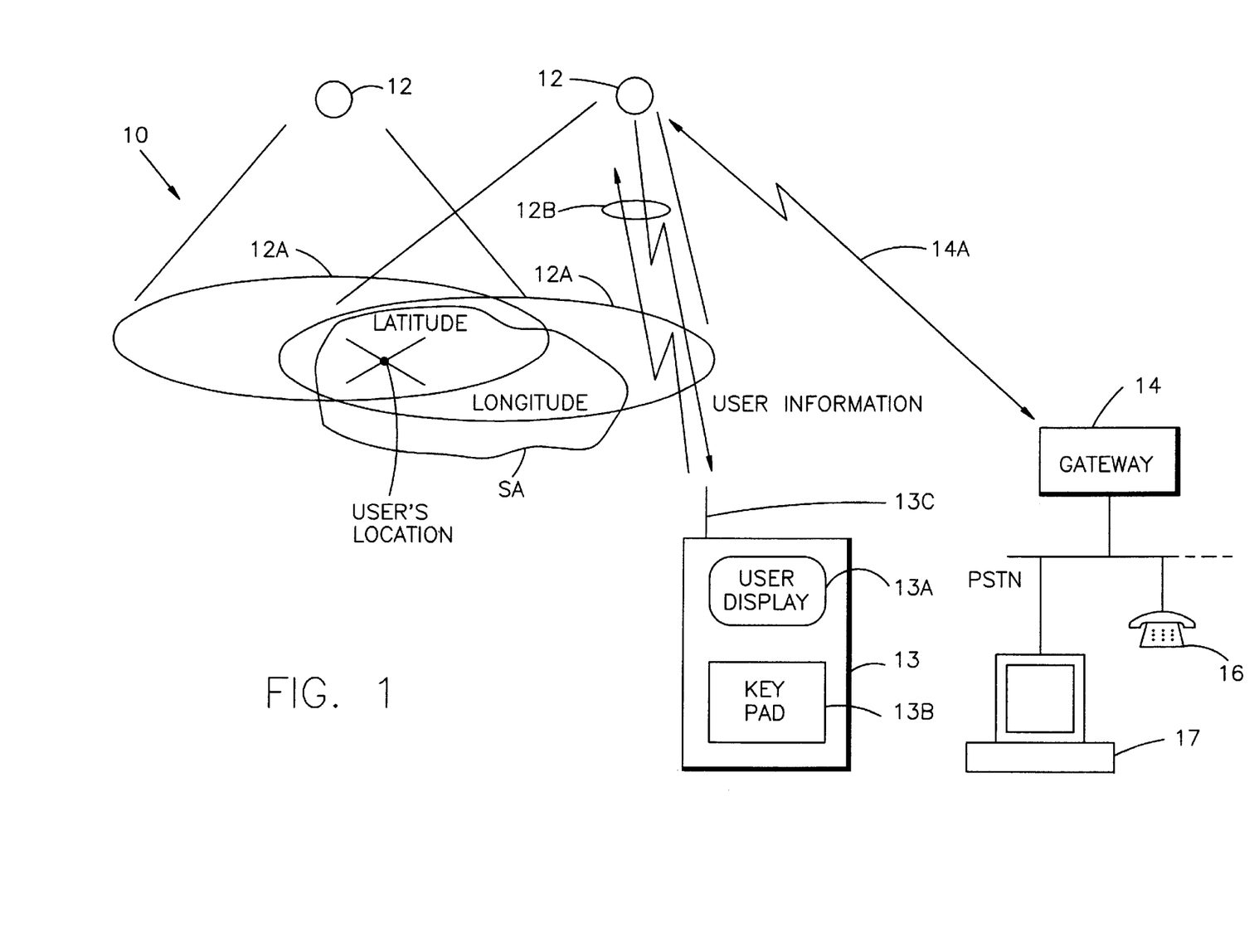
FIG. 1 is simplified block diagram of a satellite communications system in accordance with this invention.

Reference is made now to FIG. 1 for illustrating a portion of a LEO satellite communications system 10 that operates in accordance with this invention. Although described below in the context of a LEO satellite communications system, it should be realized that the teaching of this invention is also applicable to other than LEO systems, such as medium earth orbit (MEO) systems.

A plurality of satellites 12 of a satellite constellation each have an associated "footprint" 12a that is projected on the surface of the Earth and that moves with the satellite. A user terminal 13 has a display 13a, a key pad 13b, and an antenna 13c. Using suitable RF circuitry (not shown in FIG. 1) and the antenna 13c the user terminal 13 is able to send requests to, and receive information from a terrestrial gateway 14. The requests and information are relayed by at least one of the satellites 12 with RF links 12b to the antenna 13c, and with RF feeder links 14a to the gateway 14. The ephemeris and location of the satellites 12 is known by the gateway 14, and is also preferably known by the user terminal 13.

In the presently preferred embodiment of this invention the gateway 14 is connected to the PSTN, providing a communication path from the user terminal 13 to terrestrial telephones 16 and/or terrestrial data facilities, shown generally as a computer 17.

The footprints of satellites 12 are shown to both be illuminating a gateway service area (SA). The user terminal 13 is at one particular location within the SA, and is thus positioned at a particular latitude and longitude. The gateway 14 knows the location of the user terminal 13, in that the gateway 14 calculates the user terminal's position at the time of log-on and registration to the system. The gateway 14 can use, by example, the system's own ability to the calculate the user's position (such as by triangulation), and/or can employ Global Positioning Satellite (GPS) information or other known types of techniques. Furthermore, and by example, the location of the user terminal 13 may also be determined by the gateway 14 for each telephone call, prior to authorizing connection.

Figures 2A, 2B:
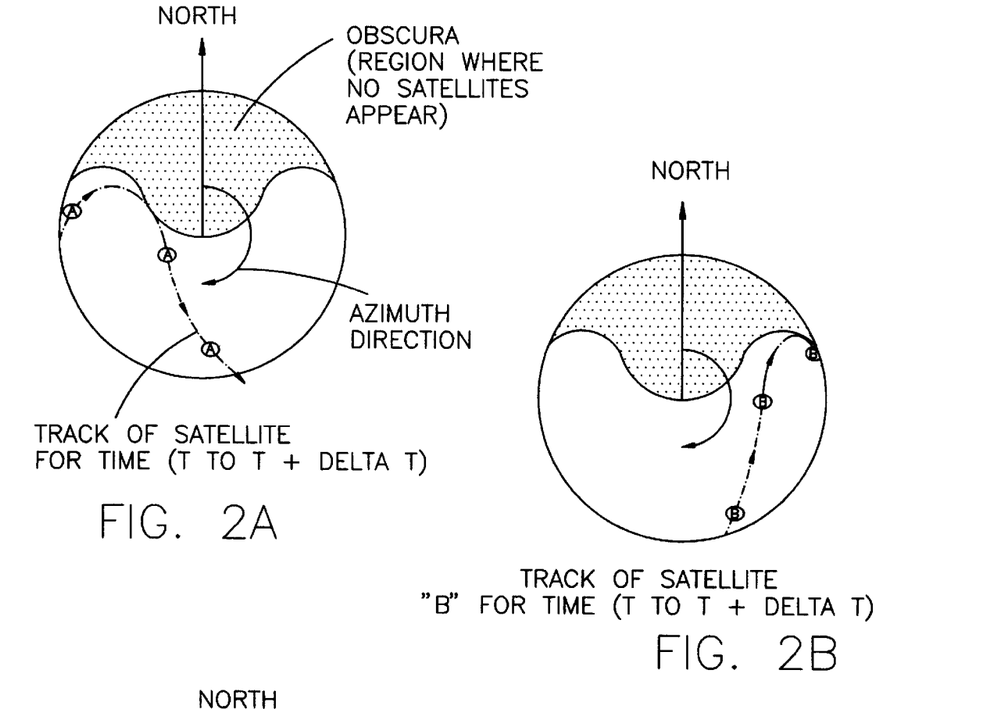
FIGS. 2A and 2B are each a view of the sky directly above a user terminal, and illustrate a satellite-devoid region referred to herein as "obscura" and also a track of two satellites ("A" and "B") with respect to time.

Referring now to FIGS. 2A and 2B, there is shown a view of the sky (a "fisheye" view) looking directly upwards from a user terminal 13. The user terminal 13 is assumed to be positioned at the center of the circle. As a result of the specifics of the particular satellite constellation, there exists a region of sky where the satellites 12 appear, and a region of sky where no satellites are ever visible. The relative sizes and shapes of these two regions depend on the inclination of the orbit, the height of the orbit, the ellipticity of the orbit, and the latitude and longitude of the user. The region where the satellites 12 never appear is referred to herein as "obscura". Any satellites 12 which are within the view of the user terminal 13 are thus located in the remaining region, and will appear there either singly or in groups, depending on the number of satellites in the constellation, the height of the orbit, the inclination, and the ellipticity of the orbit. FIGS. 2A and 2B reflect the case for circular inclined orbits of about 1400 km and a user terminal positioned at about 45° north latitude.

It should be noted that the relative size of the obscura region changes with latitude (i.e., at higher latitudes the relative size of the obscura region grows larger for the example shown). As the constellation of satellites 12 revolves about the earth the positions of the satellites 12 change with time.

By example, in a presently preferred but not limiting embodiment of this invention there are a total of 48 satellites 12 in a 1414 km Low Earth Orbit (LEO). The satellites 12 are distributed in eight orbital planes with six equally-spaced satellites per plane (Walker constellation). The orbital planes are inclined at 52° with respect to the equator and each satellite completes an orbit once every 114 minutes. This approach provides approximately full-earth coverage with, preferably, at least two satellites in view at any given time from a particular user location between about 70° south latitude and about 70° north latitude. As such, a user is enabled to communicate to or from nearly any point on the earth's surface within a gateway 14 coverage area to or from other points on the earth's surface (by way of the PSTN), via one or more gateways 14 and one or more of the satellites 12, possibly also using a portion of the telephone infrastructure segment represented by the PSTN.

From FIGS. 2A and 2B it can be realized that the direction of the "best" satellites in azimuth around the user terminal 13 can be calculated, either by the user terminal 13, or by the gateway 14. What is necessary to make such a calculation is a knowledge of the location of the user terminal, the ephemeris of the satellites, the date, and the time of day.

Figures 3A, 3B:
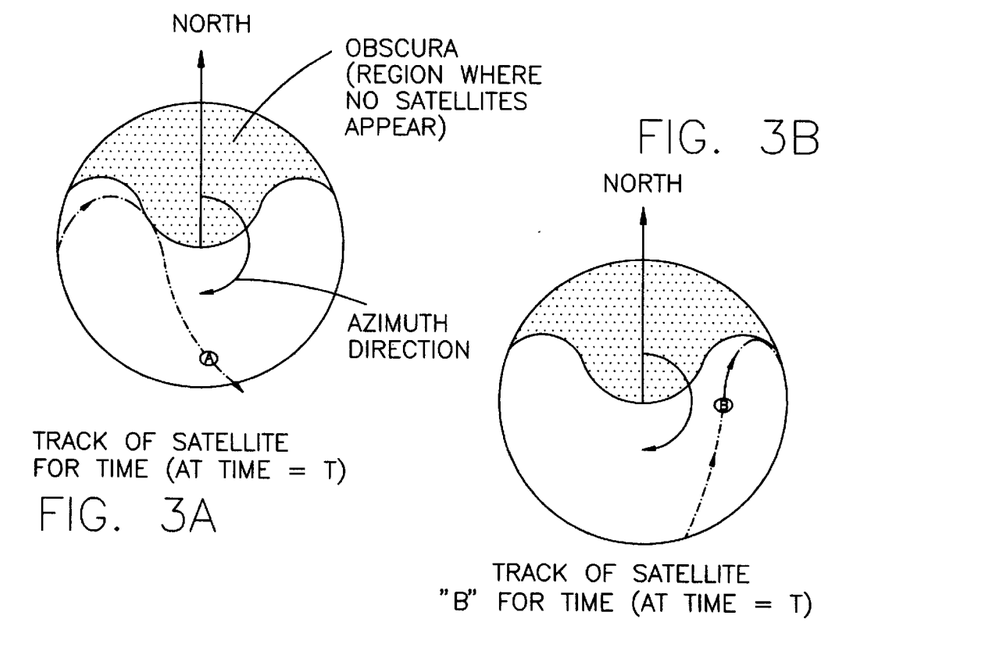
FIGS. 3A and 3B illustrate the positions of satellites "A" and "B" with respect to the user terminal at a given instant in time.
Figure 4:
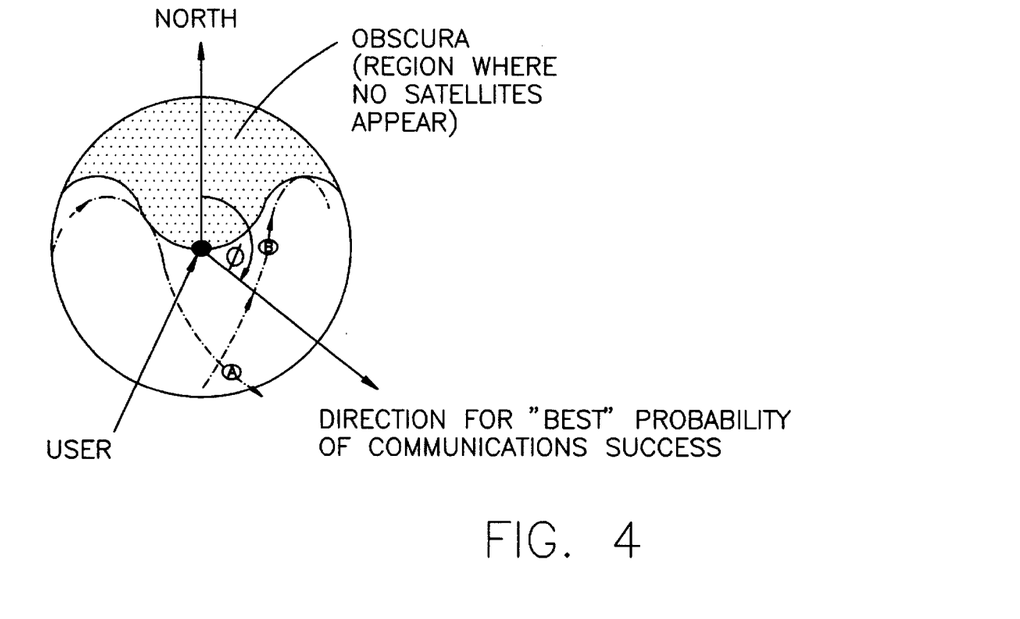
FIG. 4 illustrates the two satellite positions of FIGS. 3A and 3B superimposed in the view of the sky over the user terminal, and further illustrates, relative to the user terminal, a direction having a highest probability for communications success when simultaneously communicating through both satellites "A" and "B" (i.e., using two satellite diversity)

FIG. 2A shows the motion of a satellite 12, designated as "A", over the user terminal 13. The satellite "A" moves from low on the horizon to a highest point, returning to the horizon after crossing a portion of the sky open to the user terminal. Should an obstruction be located in the azimuthal and elevation angle which would obscure the satellite 12, the line of sight to and therefore the communications with the user terminal 13 is interrupted. FIG. 2B shows a motion of a second satellite "B" during the same period of time as that shown for satellite "A". Note that they do not coincide. By example, the position of satellites "A" and "B" at a particular instant in time is shown in FIGS. 3A and 3B, while FIG. 4 shows the satellites "A" and "B" superimposed, at the same instant of time, within the clear sky region over the user terminal 13. Although two satellites are shown in these Figures, it should be realized that at any given time there may be more than two satellites in view of the user terminal 13.

Various techniques can be employed to estimate the "best" direction in order to affect maximum communications performance. As but one example, an estimate of the azimuth direction which would "split" the two satellites can be obtained by calculating a first azimuth direction to satellite "A", then a second azimuth direction to satellite "B", deriving the difference of the two, dividing the difference by two, and adding the result to the first determined azimuth direction. In accordance with an aspect of this invention, the result may then be used to direct the user to some optimum location, position and/or orientation to effect maximum communications performance.

As employed herein a determined "best position" of the user terminal 13 is intended to encompass at least one of a location (e.g., latitude and longitude) of the user terminal, an elevation of the user terminal (e.g., floor of multi-storied building), and an orientation of the user terminal and/or user terminal antenna (e.g., an angular orientation with respect to the determined "best" direction to one or more of the satellites 12).

Figure 5:
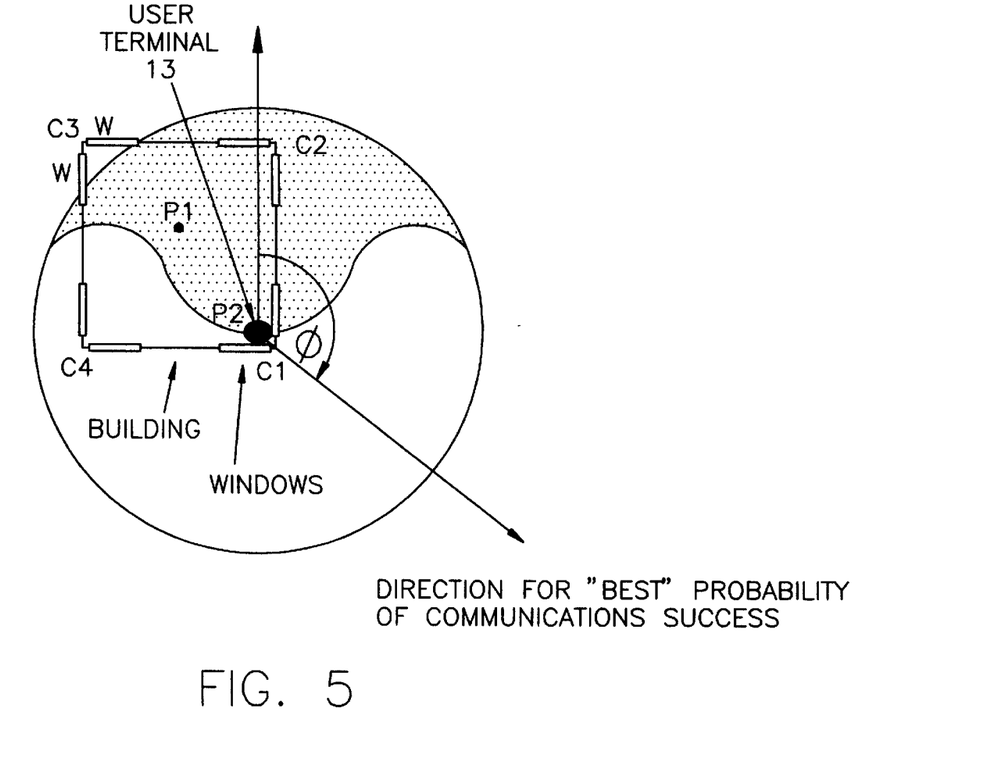
FIG. 5 illustrates the view of the sky of FIG. 4 upon which is superimposed an exemplary windowed building within which the user terminal is located, this Figure being particularly useful in explaining the user instruction feature of this invention.

FIG. 5 illustrates one typical example of where the teaching of this invention finds utility. In FIG. 5 the user terminal 13 is assumed to be located within a building having windows (W) located in each of four corners (designated as C1–C4). An initial position of the user terminal 13 is indicated as P1. Based on the position of the user terminal 13 (latitude and longitude), and on the relative positions of the satellites A and B as shown in FIG. 4, the user is instructed to move to a position P2 that is adjacent to windows facing the "best direction" (e.g., windows facing the south-east), in this case the windows at corner C1. It should be noted that some portions of the windows in corners C2 and C4 may also provide adequate communications performance.

At least two methods are available for calculating and communicating this information to the user. A first method, illustrated in FIG. 6, employs information that is stored in, and/or that may be calculated by, the user terminal 13. With this capability the user terminal 13 can autonomously determine the best direction and/or location to transmit from in order to maximize the quality of the satellite/user terminal communications link.

Figure 7:
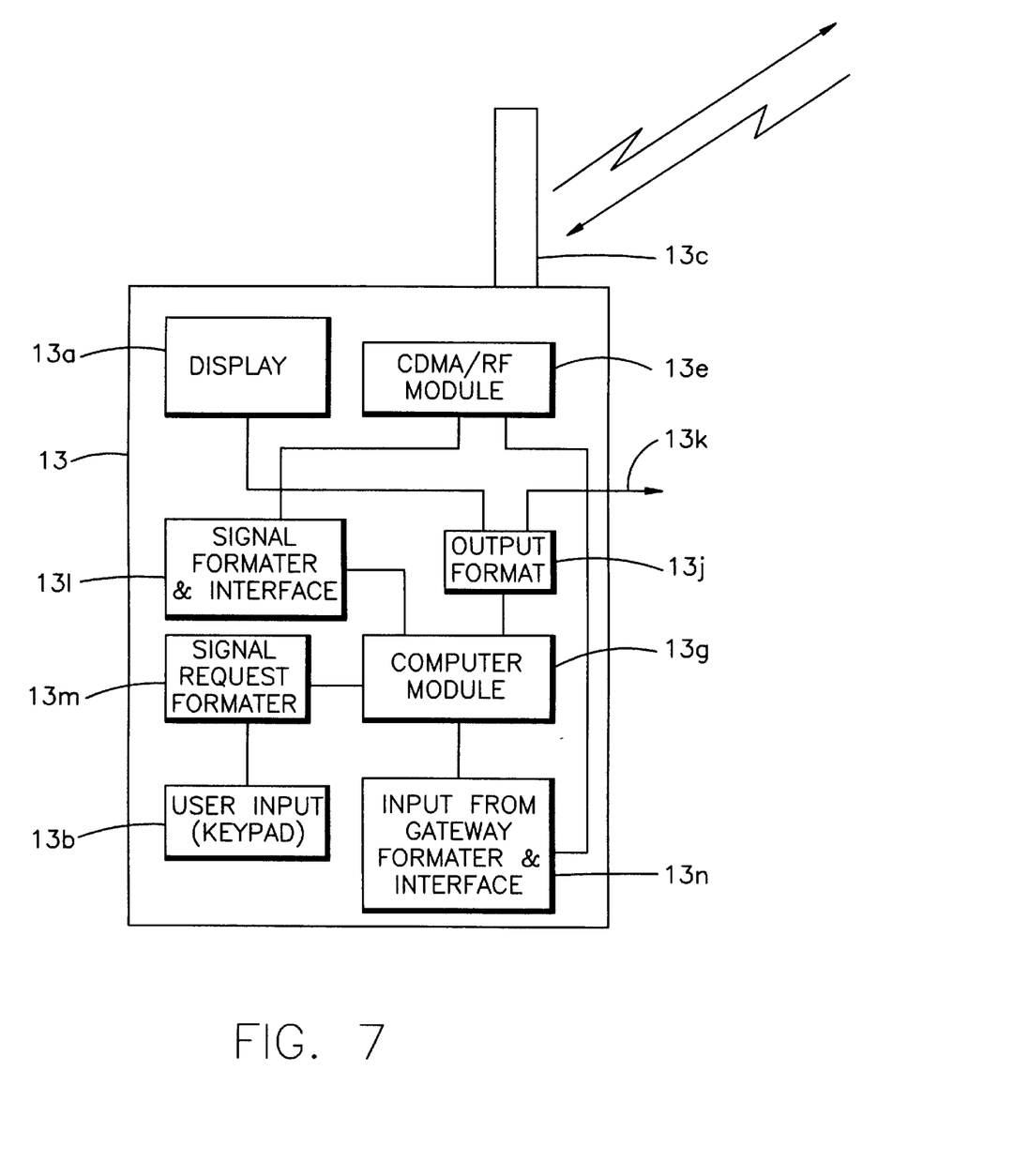
FIG. 7 is a block diagram of a second embodiment of a satellite communications user terminal, specifically a "gateway assisted user information request" embodiment.

A second method, illustrated in FIG. 7, enables the user to request assistance from the gateway 14 to perform the same function. In this case the gateway 14 performs the calculation for the user terminal 13 and sends the resulting information over the RF links 14a and 12b, via at least one of the satellites 12.

An advantage of the first method is that there is little or no information transferred over the satellite relay system, thereby conserving capacity for voice, data, and other traffic. A further advantage of the first method is that it enables a user terminal that is out of communication with a gateway to possibly establish a communication link with the gateway.

Figure 8:
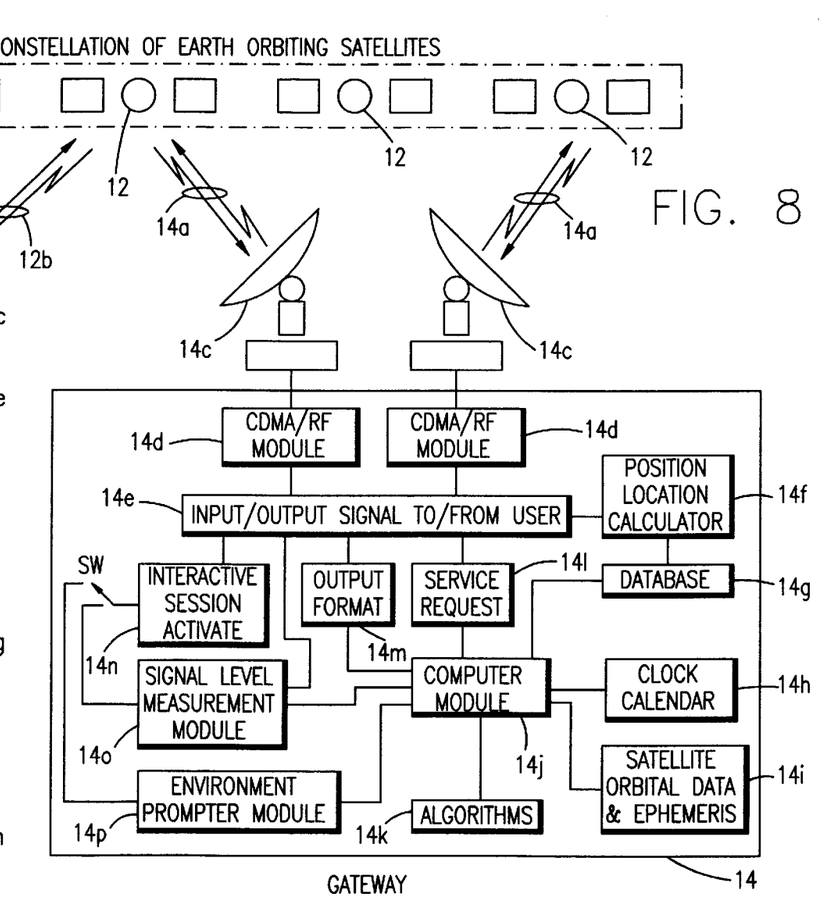
FIG. 8 block diagram of a satellite communications system of this invention having a gateway assisted user information request and interactive user terminal.

As is illustrated in FIG. 8, a further ability of the system 10 is a capability to calculate and predict in the future a "best" situation for communication. For example, a user may wish to receive data through the satellite communications system 10 by leaving his user terminal 13 on and unattended. In this case the required data can be downloaded to the user terminal 13 via the PSTN, gateway 14 and satellite 12. The user terminal 13, in turn, then outputs the data to, by example, an attached computer for storage. For this case, the user could request from the gateway 14 future satellite constellation information. The gateway 14 predicts a range of user terminal positions that would provide the best link quality during the specified time(s). Alternatively, these calculations could be performed by the user terminal itself using, by example, a displayed menu to prompt the user to enter, via the keypad 13b, the required data (e.g., the date and time of day at which the data will be downloaded).

It is also within the scope of this invention to employ a directional antenna for the user terminal antenna 13, which is either mechanically or electrically driven to point in the direction that is determined to maximize the communications link quality. Such a directional antenna need not be expensive, in that it could provide, by example, hemispherical, quarter hemispherical, or highly directive performance. In any case the output of the user information request system of this invention can be used to either point the antenna in real time, or in accordance with predictive data. Information on satellite locations and best directions according to best choice determination techniques may be downloaded to the user terminal 13 from the gateway 14.

Figure 6:
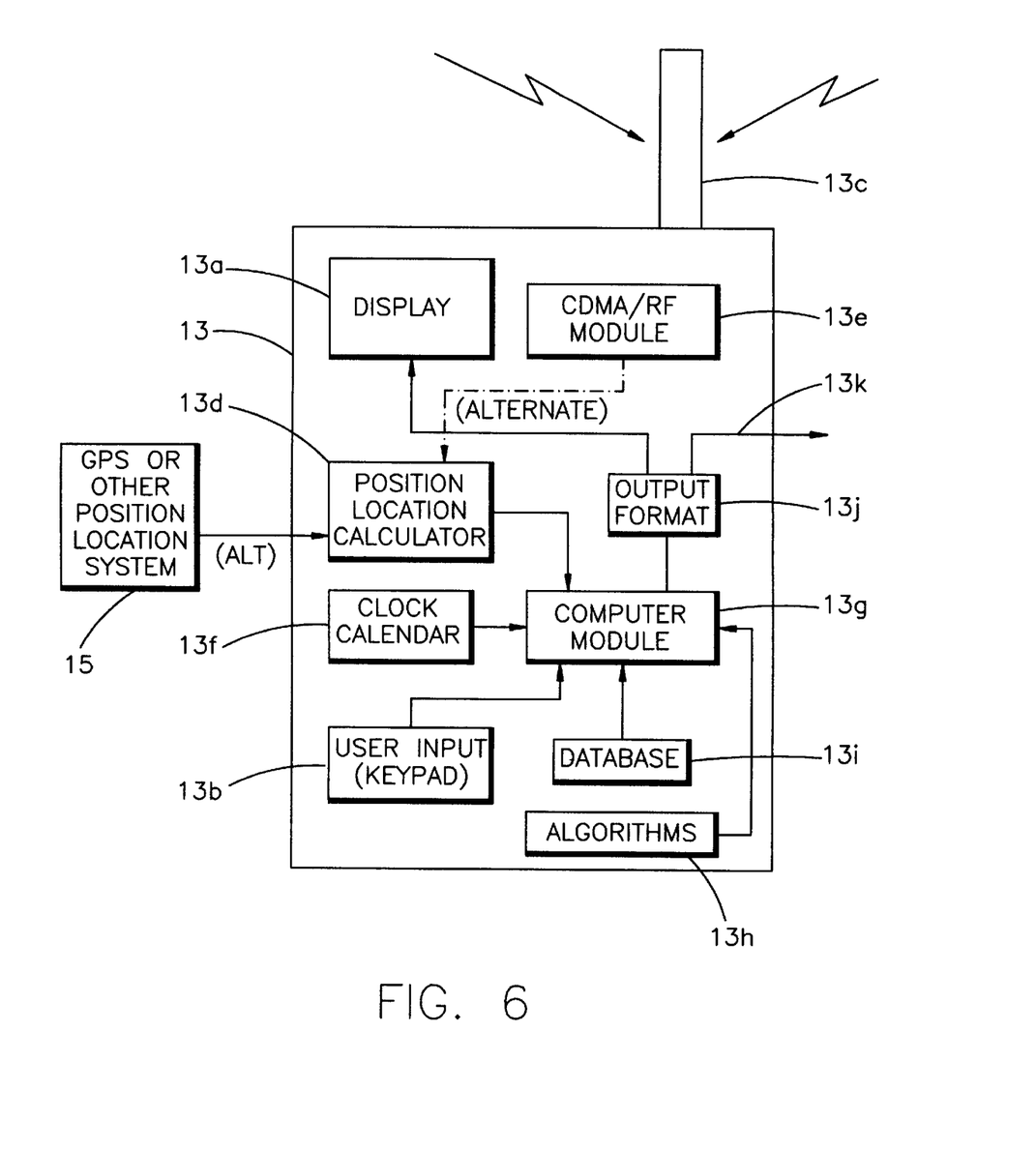
FIG. 6 is a block diagram of a first embodiment of a satellite communications user terminal, specifically a "passive user assist" embodiment.

Referring to FIG. 6, a description is now made of the method of this invention that was referred to above. The user terminal 13 includes a position location calculator 13d that receives an input from, by example, a GPS or other position location system 15 and/or from the satellites themselves and/or from gateway 14 via a satellite 12, the antenna 13c, and a CDMA/RF module 13e. The user terminal 13 also includes a real-time clock and calendar module 13f, and a controller, such as computer module 13g, that provides an ability to calculate under the control of stored algorithms 13h, or look up in a database 13i, the position of the satellites 12. A necessary input to the computer module 13g is the position (latitude and longitude) of the user terminal 13. The clock and calendar module 13f establishes an orbital time referenced to some standard, such as Universal Time. Using initial values for the satellite orbits and ephemeris (stored in database 13i) a calculation can be made to develop the azimuthal and elevation angles to the various one or ones of the satellites 12 that are in view of the user terminal 13. These values are combined to produce the "best" direction result to obtain optimum communications link performance. A number of different techniques can be employed and used in accordance with user input from the keypad 13b. For example, a user may choose a Building_Window selection from a displayed menu, which in turn selects an appropriate technique to best fit the user's situation (as in FIG. 5). By example, the gateway 14 first retrieves the user's location, then retrieves the user-provided information (e.g., Building_Window), then retrieves the constellation ephemeris (present and/or future), and then calculates the optimum location for the user terminal. The result may then be properly formatted so as to reflect the user's input, such as by instructing the user to position the terminal near to a window at the calculated optimum location. The user could also be prompted for further environment-related information, such as by querying the user as to what floor of the building the user is located (i.e., the user's elevation). The user's elevation can then be employed also when calculating the optimum location of the user terminal with respect to one or more of the visible (or soon to be visible) satellites of the constellation. Alternatively, the user could choose a Mountain_Forest selection, and a different technique would be used. In any case the result is displayed or communicated to the user in some manner in an appropriate output format (block 13j). The output need not be displayed on the user terminal's visual display 13a, but could be presented as computer generated voice, or could be routed (path 13k) to an external display means, such as an attached computer terminal, for presentation to the user.

Based on the presented information the user is enabled to optimize his or her location or direction with respect to the satellites 12 that are in view. Alternatively, the result can be outputted in azimuth and/or elevation format for driving some external or internal device with respect to the user terminal 13. For example, a directional antenna can be configured to only transmit and receive from the "best" direction, thereby increasing the user terminal antenna gain, and subsequently reducing the user terminal transmit power.

As was indicated previously, the user may select a time in the future to calculate the "best" direction, by entering selected times with the keypad 13b to the computer module 13g. The computer module 13g then advances the date and time to the selected date and time and performs the best direction calculation. In addition to entering the future date and time, it is also within the scope of the invention to enter a future position of the user terminal, assuming that the position is known with sufficient accuracy.

Alternatively, predictions for a range of times may be made. In this case the user is enabled to select from a displayed list of "best" directions during the range of times, or the user may be informed of a future time that would be optimal for communication with the satellite(s), as a function of the changing constellation configuration during the range of times selected.

Reference is now made to FIG. 7 for showing a user terminal 13 constructed to operate in accordance with the second method of this invention, i.e., the gateway assisted user information request system method. Those components of the user terminal 13 that are common to the embodiment of FIG. 6 are designated accordingly. Reference is also made to FIG. 8, which illustrates in greater detail the components of the gateway 14 that participate in the method.

In the embodiment of FIGS. 7 and 8 the user terminal 13 is not required to calculate the "best" direction, but relies instead on the gateway 14 to perform this function. This has the effect of reducing the complexity of the user terminal 13, at the expense of some increase in over the air signaling. However, the fraction of traffic used for this function is relatively small. Furthermore, the gateway 14 typically will have more up-to-date satellite ephemeris information available than the user terminals 13, and can thus make more precise "best" direction calculations.

Referring to FIGS. 7 and 8, the user terminal 13 is provided with a signal formatter and interface block 131 that is interposed between the CDMA/RF module 13e and the computer module 13g. A user terminal signal request formatter block at 13m is likewise interposed between the keypad 13b and the computer module 13g. Interposed between the CDMA/RF module 13e and the computer module 13g is a gateway message formatter and interface block 13n.

Referring now specifically to FIG. 8, the gateway 14 includes a plurality of steerable dish antennas 14c each of which is connected to an associated CDMA/RF module 14d. Modules 14d are bidirectionally connected to an interface block 14e through which various signals pass. The gateway 14 further includes a user terminal position location calculator 14f, a database of user terminal-related information 14g, a clock calendar module 14h, and a satellite orbital data and ephemeris block 14i. A gateway controller embodied in a computer module 14j operates under the direction of algorithms 14k to interact with the user terminal 13 so as to calculate and transmit "best" direction data to the user terminal 13. To this end the gateway 14 includes a service request block 141 for receiving a service request from the user terminal 13, and also an output format block 14m for providing the requested information back to the user terminal 13 through the interface block 14e, CDMA/RF module 14d, at least one of the antennas 14c, and at least one of the satellites 12. The gateway 14 further includes an interactive user terminal session activation block 14n that is switchably coupled with a switch (designated SW) to one of a signal level measurement module 14o and an environment prompter module 14p. The signal level measurement module 14o can be used for measuring, by example, signal strength, received power, signal quality (e.g., bit error rate), or various combinations of these received signal characteristics.

The first step in the method is for the user terminal 13 to log into the system 10. A portion of the log-on and registration procedure utilizes the user terminal's transmitted signals to determine, in block 14f, the user terminal's position, both in latitude and longitude. The position of the user terminal 13 is then entered into the database 14g. The database 14g of user terminal information is preferably updated as the user terminal 13 receives and makes calls. In this manner the user terminal's location is maintained current in the database 14g. The gateway 14 has knowledge of the satellite constellation ephemeris data (satellite location, orbital motion, and other orbital parameters) from the database 14i, and is enabled to calculate azimuthal and elevation angles to the various satellites 12 that are in view of the determined location of the user terminal 13. These values are then employed to produce the "best" direction result for the user terminal 13, which is then transmitted back to user terminal 13. Various ones of different gateway algorithms may be available to act in accordance with user terminal input.

The operation of the embodiment of FIG. 8 is as follows. It is assumed for this embodiment that the user desires to gain access to information that enables the user to attain an optimal location from which to communicate with one or more of the satellites 12. The user first signals via the keypad 13b or other type of input device (e.g., voice or computer data) the gateway 14 that a request for information service is desired. The user may select from a menu delivered to the display 13a, or to some other type of suitable output device, the type of service desired. As was described with respect to FIG. 6, the user may choose "Building-Window" from a displayed menu. This request for service is formulated by the computer module 13g and is transmitted via the signal request formatter 13m, CDMA/RF module 13e, antenna 13c, and at least one of the satellites 12, to the gateway 14. The service request signal is received by the gateway 14, processed as a service request in block 141, and is acted upon by the computer module 14j, in cooperation with the algorithms block 14k, to calculate "best" direction result. After the "best" direction result is determined it is formatted onto a data stream in block 14m and sent from the gateway 14 to the satellite 12, and thence to the requesting user terminal 13. The received "best" direction result is routed through the block 13n in the user terminal 13, is formatted into textual, aural, or some other suitable format, and is presented to the user in a user-perceptible format. Alternatively, the result, expressed in or converted to azimuth and/or elevation, can be used to point a user terminal directional antenna, as was described previously.

Another feature of the gateway assisted user information system of this invention is a capability of providing interactive user position assistance. In this mode of operation the user generally desires more information than that which can be readily communicated via the second method described above. In this case the user activates an interactive session with the gateway 14, which request is routed to and acted upon by the block 14n, and generally involves a measurement of one or more parameters of the user terminal signal characteristics as received by the gateway 14. This enhanced method begins with the user sending a service request signal that specifies interactive service. In response, the computer module 14j, in cooperation with the interactive session activation block 14n, establishes an interactive session. The user terminal location is retrieved from the database 14g, or is determined anew, the satellite positions and ephemeris is calculated as before using the database 14i, and the "best" location using an appropriate one of the algorithms 14k is determined. Next, the user terminal 13 is signaled to burst a reference tone. After receiving and decoding this request the user terminal 13 processes the gateway request and responds with a reference signal burst. The reference signal burst is received by the gateway 14 and processed, such as by routing the received reference burst via the switch to the signal level measurement module, and determined signal characteristic values are compared with reference values. From this data the gateway 14 is enabled to determine if the user terminal 13 is blocked or otherwise obstructed in the direction to one or more of the satellites 12. If the user terminal 13 is determined to not have free access to one or more of the visible satellites, the gateway 14 refines the determined "best" direction, such as by selecting another combination of satellites. The "refined best" direction can be combined with the gateway's predictive capability for the next several minutes. In any case, the gateway 14 issues appropriate instructions to the user terminal 13 that takes into account any signal blockages, or impending signal blockages based on the user terminal's current location and the position of the satellites at some future time. These instructions are formatted onto a data stream as before, and sent from the gateway 14 to one or more of the satellites 12 and thence to the user terminal 13. The result is decoded in the user terminal 13, formatted into a user perceptible format, and presented to the user. By using repetitive requests and interactions of this type the user can be guided to a position which maximizes the user's communications capability.

For paging operations, the gateway 14 is enabled to select a most favorable time to page the user terminal 13. By example, and assuming that the second method of interactive user position assistance has been accomplished, the gateway 14 predicts when the satellite(s) 12 would be at the most advantageous positions for future communication with the user terminal 13. For paging, the user terminal 13 is preferably then left in the location from which the interactive user position assistance exchange with the gateway 14 took place, e.g. on a table top or window sill. Moving the user terminal 13 by a significant amount could potentially invalidate the previously determined interactive user position assistance data.

A further interactive method may be employed to communicate additional information to the user. In this case the user supplies information that assists the gateway 14 in predicting a best course of action for the user to maximize the user's communications potential. This further method begins, as with the previously described enhanced method, with the user sending a service request signal that specifies interactive service. In response, the computer module 14j, in cooperation with the interactive session activation block 14n, establishes an interactive session. The user terminal location is retrieved from the database 14g, or is determined anew, the satellite position and ephemeris is calculated as before using the database 14i, and the "best" location using an appropriate one of the algorithms 14k is determined. The user terminal 13 is then prompted by the environment prompter module 14p to display a request for more information from the user. For example, the user is requested to enter information that is descriptive of the user's general environment, such as by selecting from a displayed menu of choices. Exemplary choices could include: IN BUILDING, ADJACENT TO CLIFF, OUTDOORS-NEXT TO BUILDING, IN AIRPLANE, etc. The user terminal 13 may either transmit the user's selection immediately to the gateway 14, or store the selection for later transmission. The gateway 14 or the user terminal 13 computer module (13g, 14j) may respond to the user's initial input with further queries that are based on the user's response to the initial query. For example, if the user responded to the initial question with "IN BUILDING", then the second question may be "WHICH SIDE?" followed by the display of a plurality of directions (N, NE, E, SE, S, . . . ), to which the user responds by selecting, if known, which side of the building that the user is closest to.

As was described previously, from this user-supplied data the gateway 14 is enabled to determine if the user terminal 13 is blocked or otherwise obstructed in the direction to one or more of the satellites 12. If the user terminal 13 is determined to not have free access to one or more of the visible satellites, the gateway 14 refines the determined "best" direction, such as by selecting another combination of satellites. The "refined best" direction can be combined with the gateway's predictive capability for the next several minutes. The end result is the issuance of an instruction to the user terminal 13 which prompts the user to take some action to improve or optimize the quality of the user terminal/satellite communications link. By example, and in accordance with the example given above, if the user responds with "SE" to the question "WHICH SIDE?", the gateway-determined instruction may be "MOVE TO SW SIDE FOR NEXT 10 MIN."

It should be realized that the user terminal 13, or the gateway 14, may also issue an instruction to the user during a telephone or data communication if it is determined that the originally specified "best" user direction or location is no longer the most optimum. That is, as the relative positions of the satellite(s) 12 change during the connection it may be the case that the user should also change location in order to maintain an optimum communications path direction to the satellite(s). In accordance with the foregoing example, and assuming that the initial user instruction was "MOVE TO SW SIDE FOR NEXT 10 MIN.", a subsequent instruction can be issued during an established voice and/or data communications link such as "MOVE TO SW SIDE TO CONTINUE CALL".

Also, the invention has been described in the context of RF links that employ Code Division, Multiple Access (CDMA). This particular modulation and access technique is presently preferred for the system 10, but is not a limitation on the practice of this invention. By example only, Time Division, Multiple Access (TDMA) techniques can also be used, as can hybrid CDMA/TDMA techniques.

Furthermore, and although described in the context of a constellation of LEO satellites, other orbital configurations can be used, such as a constellation of inclined circular orbits having an altitude of, by example, 5500 nautical miles or greater.

Also, in the presently preferred embodiments of this invention the satellites 12 function as "bent pipe" repeaters that receive, frequency translate, and transmit the RF links 12b and 14a, without regard for any informational content of the communications traffic signals. However, it is within the scope of this invention to provide all or some of the satellites 12 with some degree of on-board signal processing capability and/or inter-satellite links, and to thus perform all or some of the user position determination, satellite position determination, optimum user location determination and instruction methods described above on-board the satellite (s).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a satellite communications system having a plurality of earth orbiting satellites, at least one terrestrial user terminal, and at least one terrestrial gateway, comprising the steps of:
   determining a location of the user terminal;
   determining locations of one or more satellites with respect to the determined location of the user terminal;
   determining, in accordance with the determined location of the user terminal and the determined locations of the one or more satellites, a second location of the user terminal that provides a best communications path between the user terminal and the one or more satellites; and
   presenting an instruction to an operator of the user terminal, the instruction indicating the determined second location.

2. A method as set forth in claim 1, wherein at least one of the steps of determining is performed in the user terminal.

3. A method as set forth in claim 1, wherein at least one of steps of determining is performed in the gateway.

4. A method as set forth in claim 1, wherein at least one of the steps of determining is performed in at least one of the satellites.

5. A method as set forth in claim 1, wherein the step of determining locations of one or more satellites uses a current time and date.

6. A method as set forth in claim 1, wherein the step of determining locations of one or more satellites uses a future time and date.

7. A method as set forth in claim 6, and further comprising a step of:
   prompting the operator to input a future time and date; and
   determining the locations of the one or more satellites in accordance with the future time and date that is inputted by the operator.

8. A method as set forth in claim 1, wherein the step of determining locations of one or more satellites employs satellite ephemeris data that is stored in at least one of the user terminal and the gateway.

9. A method as set forth in claim 8, and for the case where the satellite ephemeris data is stored in the user terminal, further comprising an initial step of transferring all or part of the satellite ephemeris data from the gateway to the user terminal through at least one satellite.

10. A method for operating a satellite communications system having a plurality of earth orbiting satellites, at least one terrestrial user terminal, and at least one terrestrial gateway, comprising the steps of:
    determining a location of the user terminal;
    determining locations of one or more satellites with respect to the determined location of the user terminal;
    determining, in accordance with the determined location of the user terminal and the determined locations of the one or more satellites, a position of the user terminal that provides a best communications path between the user terminal and the one or more satellites; and
    presenting an instruction to an operator of the user terminal, the instruction indicating the determined position, wherein the step of determining a position of the user terminal includes the steps of:
    prompting the operator to input information descriptive of an environment of the user terminal; and
    determining the position also in accordance with the information that is inputted by the operator.

11. A method for operating a satellite communications system having a plurality of earth orbiting satellites, at least one terrestrial user terminal, and at least one terrestrial gateway, comprising the steps of:
    determining a location of the user terminal;
    determining locations of one or more satellites with respect to the determined location of the user terminal;
    determining, in accordance with the determined location of the user terminal and the determined locations of the one or more satellites, a position of the user terminal that provides a best communications path between the user terminal and the one or more satellites; and
    presenting an instruction to an operator of the user terminal, the instruction indicating the determined position, and comprising the initial steps of:
    generating a request for service in the user terminal; and
    transmitting the request for service from the user terminal through at least one satellite to the gateway;
    wherein the steps of determining are executed within the gateway;

and wherein the step of presenting includes an initial step of transmitting the instruction from the gateway to the user terminal through at least one satellite.

12. A method as set forth in claim 11, wherein the step of transmitting employs a code division, multiple access transmission.

13. A satellite communications system having a plurality of earth orbiting satellites, at least one terrestrial user terminal, and at least one terrestrial gateway, comprising:

means in said system for determining a location of the user terminal;

means in said system for determining locations of one or more satellites with respect to the determined location of the user terminal;

means in said system for determining, in accordance with the determined location of the user terminal and the determined locations of the one or more satellites, a second location of the user terminal that provides a best communications path between the user terminal and the one or more satellites; and means for presenting an instruction to an operator of the user terminal, the instruction indicating the determined second location.

14. A system as set forth in claim 13, wherein said user terminal is comprised of at least one of said means for determining.

15. A system as set forth in claim 13, wherein said gateway is comprised of at least one of said means for determining.

16. A system as described in claim 13, wherein at least one of said means for determining is located within at least one of said plurality of satellites.

17. A system as set forth in claim 13, wherein said means for determining locations of one or more satellites uses a current time and date.

18. A system as set forth in claim 13, wherein said means for determining locations of one or more satellites uses a future time and date.

19. A system as set forth in claim 18, and further comprising means for prompting the operator to input a future time and date.

20. A system as set forth in claim 13, and further comprising means in said system for storing satellite ephemeris data, and wherein said means for determining locations of one or more satellites employs the stored satellite ephemeris data.

21. A satellite communications system having a plurality of earth orbiting satellites, at least one terrestrial user terminal; and at least one terrestrial gateway, comprising:

means in said system for determining a location of the user terminal;

means in said system for determining locations of one or more satellites with respect to the determined location of the user terminal;

means in said system for determining, in accordance with the determined location of the user terminal and the determined locations of the one or more satellites, a position of the user terminal that provides a best communications path between the user terminal and the one or more satellites; and means for presenting an instruction to an operator of the user terminal, the instruction indicating the determined position, wherein said means for determining a position of the user terminal is comprised of means for prompting the operator to input information descriptive of an environment of the user terminal; and wherein said means for determining the position is responsive to information input by the operator.

22. A satellite communications system having a plurality of earth orbiting satellites, at least one terrestrial user terminal, and at least one terrestrial gateway, comprising:

means in said system for determining a location of the user terminal;

means in said system for determining locations of one or more satellites with respect to the determined location of the user terminal;

means in said system for determining, in accordance with the determined location of the user terminal and the determined locations of the one or more satellites, a position of the user terminal that provides a best communications path between the user terminal and the one or more satellites; and means for presenting an instruction to an operator of the user terminal, the instruction indicating the determined position, wherein said user terminal is comprised of means for generating a request for service and means for transmitting the request for service from said user terminal through at least one satellite to said gateway; wherein all of said means for determining are located within said gateway; and wherein said gateway further comprises means for transmitting the instruction from said gateway to said user terminal through at least one satellite.

23. A system as set forth in claim 22, wherein said means for transmitting both employ a code division, multiple access transmission.

24. A method for operating a satellite communications system having a plurality of earth orbiting satellites, at least one terrestrial user terminal, and at least one terrestrial gateway, comprising the steps of:

determining a location of the user terminal;

determining locations of one or more satellites with respect to the determined location of the user terminal;

determining, in accordance with the determined location of the user terminal and the determined locations of the one or more satellites, a second location of the user terminal that provides a best communications path between the user terminal and the one or more satellites; and transmitting information to the user terminal, the transmitted information indicating the determined second location.

25. A method as set forth in claim 24, and further comprising a step of presenting the transmitted information to an operator of the user terminal in an operator-perceptible format.

26. A method as set forth in claim 24, and further comprising a step of using the transmitted information to vary at least one of a location of the user terminal, relative to the determined locations of the one or more satellites, and an orientation of an antenna of the user terminal, relative to the determined locations of the one or more satellites.

27. A method as set forth in claim 24, wherein the step of transmitting includes a step of transmitting the information from the at least one terrestrial gateway through at least one satellite to the user terminal.

28. A method as set forth in claim 24, wherein the step of determining locations of the one or more satellites determines the locations at some future time.

29. A method as set forth in claim 24, and further comprising the steps of:

presenting the transmitted information to an operator of the user terminal in an operator-perceptible format;

using the transmitted information to vary at least one of a position and an orientation of the user terminal, relative to the determined locations of the one or more satellites; and establishing at least one of a voice and a data communication link between the user terminal and the at least one terrestrial gateway via at least one of the plurality of satellites.

30. A method for operating a satellite communications system having a plurality of earth orbiting satellites, at least one terrestrial user terminal, and at least one terrestrial gateway, comprising the steps of:

determining a location of the user terminal;

determining locations of one or more satellites with respect to the determined location of the user terminal;

determining, in accordance with the determined location of the user terminal and the determined locations of the one or more satellites, a position of the user terminal that provides a best communications path between the user terminal and the one or more satellites; and transmitting information to the user terminal, the transmitted information indicating the determined position;

the method further comprising the steps of, presenting the transmitted information to an operator of the user terminal in an operator-perceptible format;

using the transmitted information to vary at least one of a position and an orientation of the user terminal, relative to the determined locations of the one or more satellites; and establishing at least one of a voice and a data communication link between the user terminal and the at least one terrestrial gateway via at least one of the plurality of satellites;

the method further comprising the steps of, during a time that the communication link is established, determining updated locations of one or more satellites with respect to a location of the user terminal;

determining, in accordance with the location of the user terminal and the determined updated locations of the one or more satellites, an updated position of the user terminal that provides a best communications path between the user terminal and the one or more satellites;

transmitting information to the user terminal, the transmitted information indicating the determined updated position;

presenting the transmitted information to an operator of the user terminal in an operator-perceptible format;

using the transmitted information to vary at least one of a position and an orientation of the user terminal, relative to the determined updated locations of the one or more satellites; and maintaining the established at least one of a voice and a data communication link between the user terminal and the at least one terrestrial gateway via at least one of the plurality of satellites.

31. A method for operating a satellite communications system having a plurality of earth orbiting satellites, at least one terrestrial user terminal, and at least one terrestrial gateway, comprising the steps of:

determining a location of the user terminal;

determining locations of at least two satellites with respect to the determined location of the user terminal;

determining, in accordance with the determined location of the user terminal and the determined locations of the at least two satellites, a position of the user terminal that provides a best communications path between the user terminal and the at least two satellites;

presenting an instruction to an operator of the user terminal, the instruction indicating the determined position; and operating said user terminal in a diversity reception mode at the determined position for receiving and combining communications signals received from said at least two satellites.

32. A method for operating a satellite communications system having a space segment comprised of a plurality of earth orbiting satellites and a terrestrial segment comprised of at least one user terminal, having a substantially omnidirectional antenna, and at least one gateway coupled to a terrestrial communications system, comprising the steps of:

in response to input from a user, sending a first communication from the user terminal to the terrestrial segment via the antenna and at least one satellite, the first communication initiating a user terminal log-on and registration procedure;

determining a location of the user terminal and storing the determining location in a database;

in response to the user initiating a call, determining an updated location of the user terminal and calculating an azimuth angle and an elevation angle to at least one satellite that is in view of the determined updated location of the user terminal;

determining, in accordance with the determined updated location of the user terminal and the calculated angles, a preferred location for the user terminal to conduct the call;

sending a second communication to the user terminal via at least one satellite, the second communication including information for specifying the preferred location; and converting the information into a user-perceptible format and presenting the formatted information to the user.

33. A method as in claim 32, wherein the step of determining a preferred location for the user terminal includes a step of also considering a strength or quality of a signal received from the user terminal.

34. A method as in claim 32, wherein the step of determining a preferred location for the user terminal includes a step of also considering user terminal environmental information that is received from the user terminal.

35. A method for operating a satellite communications system having a space segment comprised of a plurality of non-geosynchronously orbiting satellites and a terrestrial segment comprised of at least one user terminal, having a substantially omnidirectional antenna, and at least one gateway coupled to a terrestrial communications system, comprising the steps of:

in response to input from a user, determining a location of the user terminal and storing the determining location in a database;

in response to the user initiating a call, determining an updated location of the user terminal and calculating an optimal location for the user terminal relative to a track of at least one satellite that is expected to be in view of the user terminal;

sending a message to the user terminal via at least one satellite, the message including information for specifying the optimal location; and converting the information into a user-perceptible format and presenting the formatted information to the user; wherein the step of calculating is accomplished during an iterative process that attempts to compensate for signal path impairments that may exist between the user terminal and the track of the at least one satellite.

36. A method as in claim 35, wherein the step of calculating considers a strength or quality of a signal received from the user terminal.

37. A method as in claim 35, wherein the step of calculating considers user terminal environmental information that is received from the user terminal.

38. A method as in claim 35, and further comprising a step of moving the user terminal laterally with respect to the surface of the earth in response to the formatted information that is presented to the user.

39. A method as in claim 35, and further comprising a step of moving the user terminal vertically with respect to the surface of the earth in response to the formatted information that is presented to the user.

40. A method for operating a satellite communications system having a space segment comprised of a plurality of non-geosynchronously orbiting satellites and a terrestrial segment comprised of at least one user terminal, having a substantially omnidirectional antenna, and at least one gateway coupled to a terrestrial communications system, comprising the steps of:

in response to the user initiating a call, determining a current location of the user terminal;

calculating an optimal location for the user terminal relative to a track of at least one satellite that is expected to be in view of the user terminal;

sending a message to the user terminal via at least one satellite, the message including information for specifying the optimal location;

converting the information into a user-perceptible format and presenting the formatted information to the user; and moving the user terminal at least one of laterally with respect to the surface of the earth or vertically with respect to the surface of the earth in response to the formatted information that is presented to the user.

* * * * *

UNITED STATES PATENT AND TRADEMARK OFFICE
CERTIFICATE OF CORRECTION

PATENT NO. : 5,812,932
DATED : September 22, 1998
INVENTOR(S) : Robert Wiedemann et al.

It is certified that error appears in the above-identified patent and that said Letters Patent is hereby corrected as shown below:

On the title page, item [56], insert the following:

U. S. PATENT DOCUMENTS

| EXAMINER INITIAL | PATENT NUMBER | | | | | | ISSUE DATE | PATENTEE | CLASS | SUBCLASS | FILING DATE IF APPROPRIATE |
|---|---|---|---|---|---|---|---|---|---|---|---|
| | 5 | 0 | 4 | 3 | 7 | 36 | 8/27/91 | Darnell et al. | | | |
| | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 46 | 7 | 6 | 5 | 1 A1 | 22.01.92 | EPO | | | | |
| | | 0 | 58 | 6 | 9 | 0 | 6 A2 | 16.03.94 | EPO | | | | |
| | | WO 93/ | 1 | 3 | 6 | 1 | 8 | 08.07.93 | PCT | | | | |
| | | WO 92/ | 0 | 4 | 7 | 8 | 2 | 19.03.92 | PCT | | | | |

Signed and Sealed this

Twenty-third Day of March, 1999

Attest:

Q. TODD DICKINSON

*Attesting Officer*     *Acting Commissioner of Patents and Trademarks*